(No Model.) 2 Sheets—Sheet 1.

C. E. WARNER.
AUTOMATIC GRAIN WEIGHING MACHINE.

No. 397,101. Patented Jan. 29, 1889.

WITNESSES

INVENTOR.
Chas. E. Warner
by C. A. Snow & Co.
Attorneys.

(No Model.) 2 Sheets—Sheet 2.

C. E. WARNER.
AUTOMATIC GRAIN WEIGHING MACHINE.

No. 397,101. Patented Jan. 29, 1889.

WITNESSES

INVENTOR
Chas. E. Warner
by C. A. Knowles
Attorneys.

UNITED STATES PATENT OFFICE.

CHARLES E. WARNER, OF MELVERN, KANSAS, ASSIGNOR OF ONE-HALF TO CHESTER C. CATLIN, OF SAME PLACE.

AUTOMATIC GRAIN-WEIGHING MACHINE.

SPECIFICATION forming part of Letters Patent No. 397,101, dated January 29, 1889.

Application filed June 8, 1888. Serial No. 276,438. (No model.)

*To all whom it may concern:*

Be it known that I, CHARLES E. WARNER, a citizen of the United States, residing at Melvern, in the county of Osage and State of Kansas, have invented a new and useful Improvement in Automatic Grain-Weighing Machines, of which the following is a specification.

My invention relates to an improvement in automatic grain-weighing machines; and it consists in the peculiar construction and combination of devices, that will be more fully set forth hereinafter, and particularly pointed out in the claims.

Figure 1:
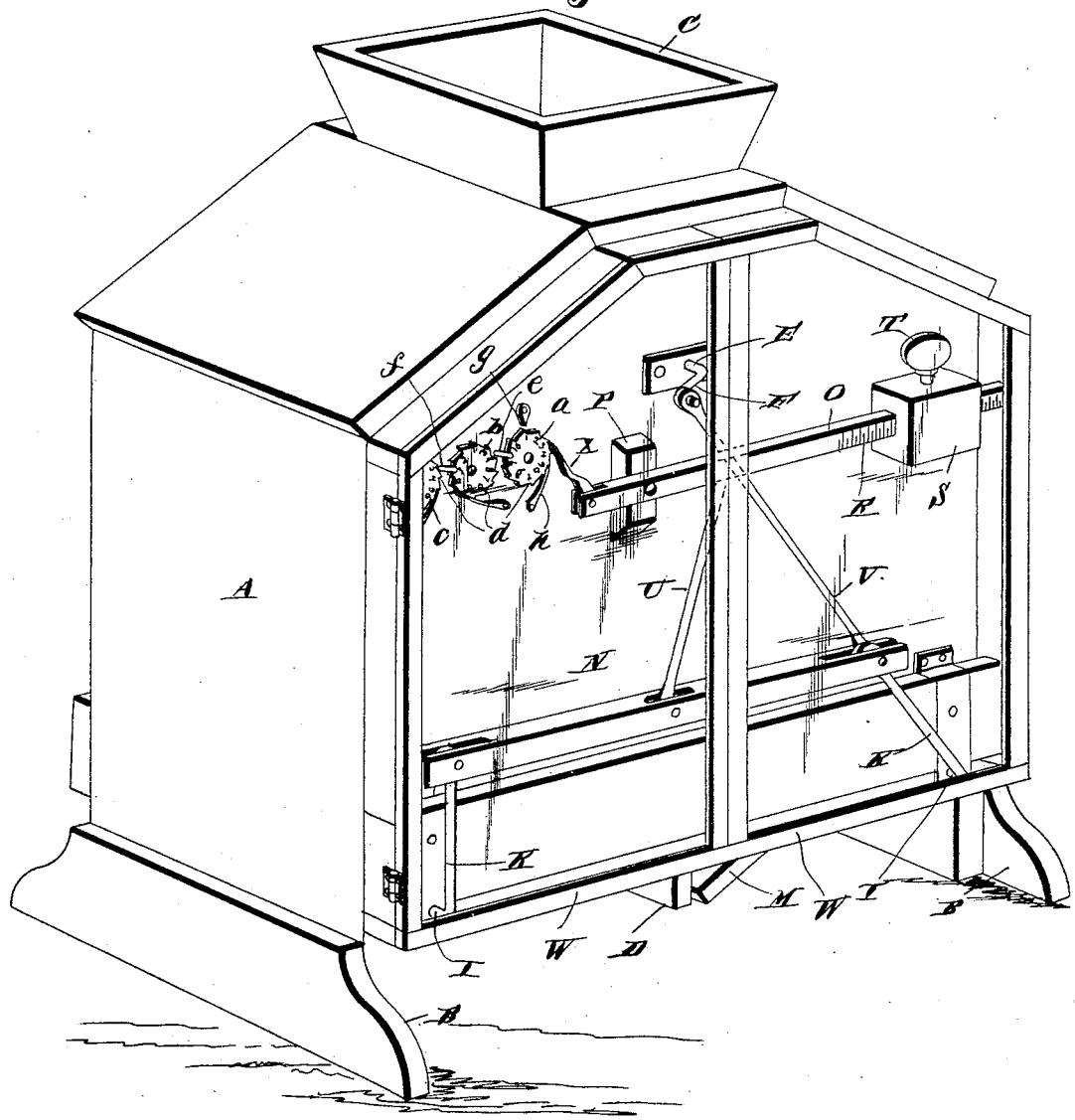
Figure 2:
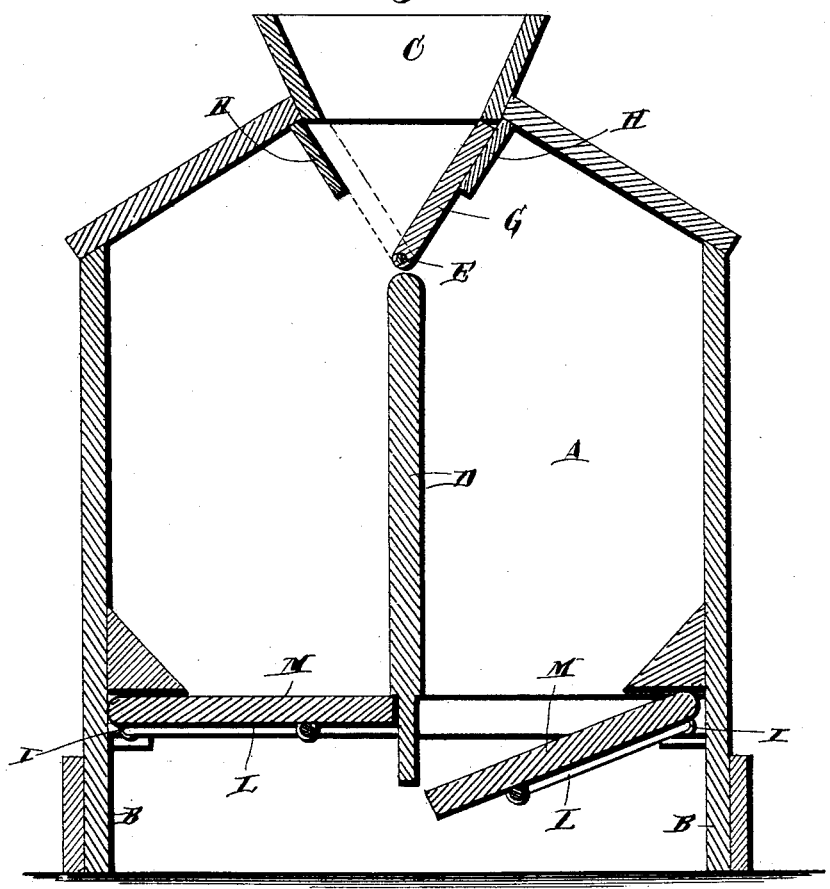
Figure 3:
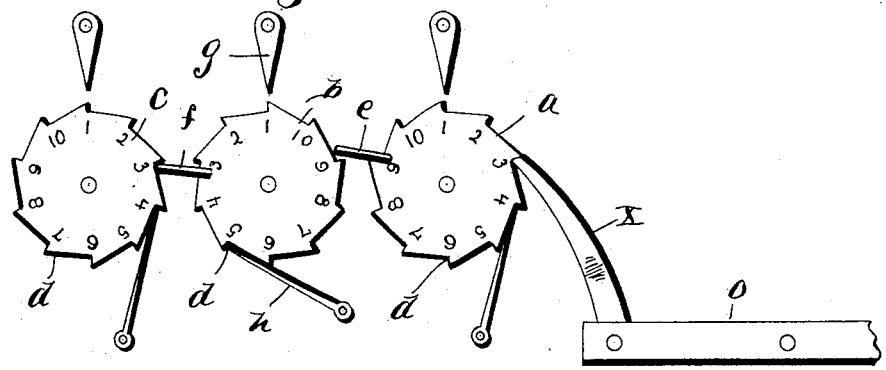

In the accompanying drawings, Figure 1 is a perspective view of a grain-weighing machine embodying my improvement. Fig. 2 is a vertical sectional view of the same. Fig. 3 is a detail view of the registering mechanism.

A represents a vertical rectangular case of suitable size, which is supported upon feet B, and has a hopper, C, at its upper end arranged over the center of the case.

D represents a vertical partition-board which is arranged in the center of the case and divides the same into two compartments of equal size. The lower end of the said board extends a slight distance below the case, and the upper end thereof is at a suitable distance from the upper side of the case.

E represents a rock-shaft, which is journaled in the sides of the case at a slight distance above the upper end of the board E, and is provided at one end with a crank, F. Secured to the said rock-shaft is a valve, G, which is adapted to turn with the rock-shaft, and the motion of the said valve is limited by a pair of cross-bars, H, which connect the sides of the case at the upper end thereof, and are arranged on opposite sides of the lower end of the hopper.

I represents a pair of rock-shafts, which are journaled in the sides of the case, at the bottom thereof and near its ends, and the said rock-shafts are provided each at one end with a crank, K, and have V-shaped arms L formed in their central portions. Arranged on said rock-shaft, and rigidly secured thereto, are a pair of platforms, M, which are adapted to close against the lower side of the case so as to form bottoms for the compartments therein.

The cranks K are connected by a link, N.

O represents a scale-beam or lever, which is pivoted near one end to a block, P, that projects from one side of the case. Said beam or lever is provided with a graduated scale, R, representing pounds or other units of weight, and on the said scale-beam is arranged a sliding weight, S, which is adapted to be secured at any desired adjustment by means of a set-screw, T.

U represents a rod, which connects the center of the link N of the scale beam or lever at a suitable distance from the fulcrum thereof, and V represents a similar rod, which connects one end of the link to the crank F.

That side of the case on which the scale-beam, link, crank-arms, and rods are arranged is provided with a pair of doors, W, having glass panes of suitable size, and the said doors are hinged to the case and adapted to fold over the mechanism before described, so as to protect the same from dust and dirt.

The construction of the registering mechanism is as follows:

*a b c* represent circular disks, which are journaled on one side of the case, and are each provided with a graduated scale and denominate units, tens, and hundreds, respectively. Each of the said disks is provided with peripheral ratchet-teeth *d*. The disk *a* has a pin, *e*, which is adapted to engage the disk *b* once at each rotation of said disk *a*, and to move said disk *b* a distance corresponding to one numbered space, and said disk *b* is provided with a similar pin, *f*, which is adapted to correspondingly engage and partly rotate the disk *c* at the end of each complete rotation of the disk *b*. Hands or pointers *g* are inscribed on one side of the case and arranged above the upper edges of the disk, and the ratchet-teeth of each disk are engaged by spring pawls or detents *h*.

X represents a dog, which is pivoted to the shorter arm of the scale-beam and engages one of the teeth of the disk *a*.

The operation of my invention is as follows: The disks are in their normal position when the ciphers thereon register with the hands or pointers g. The weight S is secured on the scale-beam at the correct point to indicate the number of pounds of grain which constitute a bushel, or other predetermined unit of measure. It will be observed by reference to Fig. 2 that one of the platforms M is closed against the bottom of the case while the other platform is open, and that the valve G is inclined so as to cover the upper end of the compartment having the open valve M. When grain is poured into the hopper, it is directed by the valve G into the closed compartment, and the grain accumulates therein on the closed valve M thereof until its weight is sufficient to overcome the gravity of the scale-beam, when the valve at the lower end of the compartment opens and discharges the grain therefrom. As the said valve opens, the crank K of its rock-shaft moves the link N so as to immediately close the opposite valve, M, and the motion of the link is communicated to the rod U, and through the same to the weight-lever so as to return the latter to its normal position and thereby cause the dog to move the units-disk $a$ the distance of one tooth, and consequently register the fact that one bushel of grain has been weighed by the machine and discharged therefrom. The motion before described of the link N causes the rod V to partly turn the rock-shaft E so as to swing the valve G over the compartment the lower end of which has just been opened, so as to cause the grain to be delivered in the compartment which has just been closed, when the operation before described is repeated, and so on until a sufficient number of bushels of grain has been weighed.

It will be understood that at each complete rotation of the units-disk the tens-disk is moved the distance of one space, and that at the complete rotation of the tens-disk the hundreds-disk is moved one space, and thereby the registering device is read from all three of the said disks, thus a given number of hundreds, plus a given number of tens, plus a given number of units.

Having thus described my invention, I claim—

1. In an automatic grain-weighing machine, the combination of the case having the vertical compartments, the hinge-valves in the bottoms of the compartments and having the cranks K, the link N, to which said cranks are connected, the valve G at the upper end of the partition between the compartments and having the crank F, the rod V, connecting said crank to the link, the weighted scale-beam O, and rod U, connecting link N to the scale-beam, substantially as described.

2. The combination, in an automatic grain-weighing machine, of the case having the compartments, the platforms or valves at the lower ends of the said compartments and having the cranks K, the link connecting the said crank, the scale-beam connected to and operated by the said link, the registering device having the ratchet-wheel $a$, and the dog X, pivoted to the scale-beam and engaging said ratchet-wheel, substantially as described.

In testimony that I claim the foregoing as my own I have hereto affixed my signature in presence of two witnesses.

CHARLES E. WARNER.

Witnesses:
C. CATLIN,
J. W. MOORE.